Patented Sept. 4, 1951

2,566,717

UNITED STATES PATENT OFFICE 2,566,717

PRODUCTION OF POLYTHIOUREAS

Albert Stanley Carpenter, Sutton Coldfield, Birmingham, and Donald L. Wilson, Coventry, England, assignors to Courtaulds Limited, London, England, a British company No Drawing. Application February 15, 1950, Serial No. 144,371. In Great Britain March 2, 1949

3 Claims. (Cl. 260—79)

This invention relates to the production of polythioureas.

Polythioureas are already known. For example, United States Patent Specification No. 2,313,871 describes a process for the manufacture of polythioureas which comprises heating substantially in stoichiometric proportions a mixture of one or more diamines and a thiourea-forming derivative of thiocarbonic acid, for example carbon disulphide. British Specification No. 524,795 describes a process for making condensation products by reacting an anhydride of a thiocarbonic acid, for example carbon disulphide, with an aliphatic diamine, the amino groups of which are separated by a chain of at least three carbon atoms; the resulting product may then be heated to give a thermoplastic substance which is capable of being drawn out into threads or the like articles.

The object of the present invention is to produce improved fibre-forming polythioureas.

The present invention comprises an improved process for the production of polythioureas by reacting carbon disulphide with one or more diamines, the amino groups of which are separated by a chain containing at least three carbon atoms, to form an intermediate salt and heating this salt until a fibre-forming thermoplastic polythiourea is obtained, wherein the carbon disulphide is reacted in the form of an aqueous emulsion with the diamine. The preferred diamines are those having the general formula $H_2N-(CH_2)_n-NH_2$, $n$ being an integer at least 3; other diamines may however be used, for example 1,4-di(methylamino)-benzene

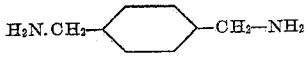

The aqueous emulsion of carbon disulphide is preferably formed in situ in the reaction mixture for example by slowly adding carbon disulphide containing one soap-forming ingredient such as oleic acid to a stirred aqueous solution of the diamine containing a second soap-forming ingredient such as triethanolamine or ammonia which reacts with the oleic acid to form an emulsifying agent in situ. In a further form of the invention a minor part of the diamine itself is used as the second component of the emulsifying agent formed in situ.

Alternatively a preformed emulsion of carbon disulphide may be added directly to the diamine or to a solution of the diamine in water, alcohol or aqueous alcohol.

The diamine and the carbon disulphide react in substantially equimolecular proportions; in view of the volatility of carbon disulphide however, it is preferred to use a slight excess, for example of the order of 5 per cent, in order to ensure that sufficient carbon disulphide is present to react with all the diamine.

In carrying out the process according to the invention, the temperature is preferably kept low, for example from 0° to 25° centigrade; thus the reaction mixture may be cooled for example by cooling jackets or by adding ice or cold water to the reaction mixture. Cooling in this manner in general increases the yield of the polythiourea.

Under the conditions of the present invention the intermediate salt is usually formed as an aqueous paste. The aqueous paste containing the intermediate salt is preferably washed with cold water to remove soluble impurities before being heated to form the desired polythiourea. The paste is in a particularly advantageous form for conversion into a polythiourea.

The heating of the intermediate salt to form the polythiourea is preferably effected by heating the salt in the presence of water or steam as described in British Specification No. 524,795 as the paste form of the salt is particularly suitable for this type of heating; this heating is preferably effected under pressure, for example at pressures of the order of 30 to 100 pounds per square inch.

The polythioureas obtained according to the invention have intrinsic viscosities which are in general higher than those obtained by reacting carbon disulphide and the diamine in solution and are consequently more suitable for fibre production. They also usually contain less impurities or by-products which may impair the colour or transparency or which may be detrimental to the use of the product in molten or dissolved form, for example in fibre production.

The present invention is illustrated by the following examples in which the parts are by weight:

*Example 1*

116 parts of hexamethylene diamine and 0.25 part of triethanolamine were dissolved in 2000 parts of water and the solution stirred mechanically at 20° to 25° centigrade while 81 parts of carbon disulphide containing 1.45 parts of oleic acid were slowly run in over a period of one hour. Stirring was continued for ½ hour after completing the addition of the carbon disulphide. The white precipitate which had formed was filtered off and washed several times with distilled water at 20° centigrade until the washings were colourless and no longer turned red litmus blue. The wet precipitate was removed from the filter and made up to 2000 parts by adding distilled water.

The mixture was transferred to a hard glass container having a loosely fitting cover to allow the escape of gases but to prevent liquids from dripping into the container. The container and its contents were placed in a steam chest capable of withstanding high pressure and fitted with a steam trap and heated at 100 pounds per square inch steam pressure for 3 hours. During this heating step hydrogen sulphide was evolved and escaped, together with condensed water, through the steam trap. The polymeric product was removed from the container and dried.

The polythiourea obtained was soluble in phenol, cresol and formic acid. It had an intrinsic viscosity in 1 per cent solution in meta cresol of 0.50, intrinsic viscosity ($\eta_i$) being defined as:

$$\eta_i = \frac{\log_e \frac{(\text{viscosity of solution})}{(\text{viscosity of solvent})}}{c}$$

where $c$ is the concentration of solution in grams per 100 ml.

For the production of fibres from the product by melt-spinning, the product may be treated to remove any insoluble, infusible material, believed to be cross-linked polymers, by dissolving in a solvent, filtering and precipitating in the presence of electrolytes; the product may also be heated under reduced pressure to remove occluded moisture and gases.

Fibres produced from the product by melt-spinning are capable of being cold drawn.

*Example 2*

100 parts of hexamethylene diamine were dissolved in 250 parts of water and the solution was rapidly stirred at 20° centigrade while an emulsion of 65.5 parts of carbon disulphide in 500 parts of water containing 2.75 parts of triethanolamine oleate as emulsifying agent, were slowly added over a period of one hour; when half the carbon disulphide had been introduced 750 parts of cold water were added to thin the mixture. When all the carbon disulphide had been added, the reaction mixture was stirred for a further ½ hour. The temperature was maintained at approximately 20° centigrade throughout. The precipitated salt was separated, washed and made up to 2000 parts by adding distilled water, as described in Example 1.

The mixture was then heated in steam as described in Example 1 for 3 hours at 100 pounds per square inch steam pressure.

The dried product was a fibre-forming polythiourea having an intrinsic viscosity in 1 per cent solution in meta-cresol of 0.40. Fibres made from the polymer were capable of being cold-drawn.

*Example 3*

101 parts of hexamethylene diamine and .25 part of triethanolamine were dissolved in 1880 parts of water and the solution was cooled to 5° centigrade by means of an ice jacket. The solution was then stirred rapidly while 76 parts of carbon disulphide containing 1.5 parts of oleic acid were added slowly over 35 minutes. At the end of this time the temperature of the reaction mixture had risen to 11° centigrade and stirring was then continued for a further ½ hour. The precipitate was separated, washed and heated in steam as described in Example 1 but in this case the heating was effected at 110 pounds per square inch steam pressure for 10 hours. The product was a fibre-forming polymer.

The hexamethylene diamine used in the above examples may be replaced by the corresponding proportion of decamethylene diamine, (116 parts of hexamethylene diamine being equivalent to 172 parts of decamethylene diamine).

What we claim is:

1. A process for the production of polythioureas by reacting carbon disulphide with a primary diamine, the amino groups of which are attached to each other by a hydrocarbon chain containing at least three carbon atoms, to form an intermediate salt and then heating this salt until a fibre-forming thermoplastic polythiourea is obtained, wherein the carbon disulphide is reacted in the form of an aqueous emulsion with the diamine, said aqueous emulsion containing an emulsifying agent.

2. A process for the production of polythioureas by reacting carbon disulphide with a primary diamine having the general formula

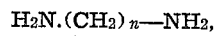
$$H_2N.(CH_2)_n-NH_2,$$

$n$ being an integer at least 3, to form an intermediate salt and then heating this salt until a fibre-forming thermoplastic polythiourea is obtained, wherein the carbon disulphide is reacted in the form of an aqueous emulsion with the diamine, said aqueous emulsion containing an emulsifying agent.

3. A process for the production of polythioureas by reacting carbon disulphide with a primary diamine, the amino groups of which are attached to each other by a hydrocarbon chain containing at least three carbon atoms, to form an intermediate salt and then heating this salt until a fibre-forming thermoplastic polythiourea is obtained, wherein the carbon disulphide containing a soap-forming ingredient is added to a stirred aqueous solution of the diamine containing a second soap-forming ingredient which reacts with the soap-forming ingredient in the carbon disulphide to form a soap whereby an emulsifying agent is formed in situ and the carbon disulphide is reacted with the diamine in the form of an aqueous emulsion containing said emulsifying agent.

A. STANLEY CARPENTER.
DONALD L. WILSON.

REFERENCES CITED

The following references are of record in the file of this patent:

UNITED STATES PATENTS

| Number | Name | Date |
| --- | --- | --- |
| 2,356,764 | Kern | Aug. 29, 1944 |